United States Patent
Bhatia et al.

(10) Patent No.: US 7,505,571 B2
(45) Date of Patent: Mar. 17, 2009

(54) COMMUNICATIONS SYSTEMS AND METHODS FOR EXCHANGING MESSAGES BETWEEN USERS

(76) Inventors: Sabeer Bhatia, 2190 Broadway, #10E, San Francisco, CA (US) 94115; Nagendra Siravara, 732 Liverpool Way, Sunnyvale, CA (US) 94087; Vinay S. Kantak, 35 North St., Topsfield, MA (US) 01983

( * ) Notice: Subject to any disclaimer, the term of this patent is extended or adjusted under 35 U.S.C. 154(b) by 1164 days.

(21) Appl. No.: 10/661,962

(22) Filed: Sep. 12, 2003

(65) Prior Publication Data
US 2004/0131081 A1 Jul. 8, 2004

Related U.S. Application Data

(60) Provisional application No. 60/410,143, filed on Sep. 12, 2002.

(51) Int. Cl.
H04M 1/64 (2006.01)
(52) U.S. Cl. ............... 379/88.22; 379/88.14; 379/88.17
(58) Field of Classification Search ................. 455/415, 455/413; 379/67.1, 88.23, 88.14, 88.17, 379/88.01, 88.22, 88.13
See application file for complete search history.

(56) References Cited

U.S. PATENT DOCUMENTS

| | | | |
|---|---|---|---|
| 5,524,137 A * | 6/1996 | Rhee ...................... 379/88.01 |
| 5,608,786 A | 3/1997 | Gordon | |
| 5,740,231 A * | 4/1998 | Cohn et al. ............... 379/88.22 |
| 5,742,668 A * | 4/1998 | Pepe et al. .................. 455/415 |
| 5,751,792 A * | 5/1998 | Chau et al. ............... 379/88.17 |
| 5,987,100 A * | 11/1999 | Fortman et al. .......... 379/88.14 |
| 6,032,039 A | 2/2000 | Kaplan | |
| 6,091,947 A | 7/2000 | Sumner | |
| 6,115,455 A * | 9/2000 | Picard ........................ 379/67.1 |
| 6,188,887 B1 * | 2/2001 | Joong et al. .................. 455/417 |
| 6,330,079 B1 | 12/2001 | Dugan et al. | |

FOREIGN PATENT DOCUMENTS

| | | | |
|---|---|---|---|
| EP | 0840491 A | 5/1998 |
| EP | 0845894 A | 6/1998 |
| EP | 1014629 A | 6/2000 |

OTHER PUBLICATIONS

International Search Report cited in related PCT/US03/28619 issued Mar. 3, 2004, 7 pages.
Patel A., et al. "A Technique for Multi-Network Access to Multimedia Messages" Computer Communications, Elsevier Science Publishers, vol. 20, No. 5, Jul. 1, 1997, pp. 324-337.
Croak, M.R., Unified Messaging Will Deliver The Message AT&T Technology, American Telephone & Telegraph Co. vol. 4, No. 2, 1989, pp. 2-5.

*Primary Examiner*—Olisa Anwah
(74) *Attorney, Agent, or Firm*—Lathrop & Gage LLP

(57) ABSTRACT

A communications system exchanges messages between users. A messaging store stores the messages. A messaging server accesses and manages messages of the message store. A plurality of servers interface between the messaging server and different networks of the users. Processes employing dynamic mailboxes and for selectively retrieving messages are also provided.

7 Claims, 12 Drawing Sheets

U.S. PATENT DOCUMENTS

| | | | |
|---|---|---|---|
| 6,389,276 B1 * | 5/2002 | Brilla et al. | 455/413 |
| 6,522,727 B1 * | 2/2003 | Jones | 379/88.23 |
| 6,751,298 B2 * | 6/2004 | Bhogal et al. | 379/88.13 |
| 6,829,334 B1 * | 12/2004 | Zirngibl et al. | 379/88.17 |
| 6,876,729 B1 * | 4/2005 | Kuter et al. | 379/88.22 |
| 6,925,299 B1 * | 8/2005 | Sofer et al. | 455/414.2 |
| 7,107,298 B2 * | 9/2006 | Prahlad et al. | 707/204 |
| 7,136,897 B1 * | 11/2006 | Raghunandan | 709/206 |

* cited by examiner

COMMUNICATIONS SYSTEMS AND METHODS FOR EXCHANGING MESSAGES BETWEEN USERS

RELATED APPLICATIONS

This application claims priority to U.S. Provisional Application No. 60/410,143 filed Sep. 12, 2002, which is hereby incorporated by reference.

BACKGROUND

Modern day telecommunications are making the world "a global village" such that world-wide communications is substantially real-time. Current telephone companies are not only selling regular services, such as telephone or data services, but they are also aggressively marketing value-added services. One example of a value-added service involves enhanced systems for messaging, such as voice mail. A number of other value-added services attempt to converge telephone with data. One disadvantage of such services is that each service requires a unique telephone number.

Another problem with current telecommunications is experienced by people that have a variety of communications needs and responsibilities at different times. For example, mobile and remote workers have a need to be aware of messages; however, if traveling, or in a virtual office, it is quite difficult to check e-mail and faxes when they may only have a few minutes at a phone.

Current telecommunication systems typically employ servers that store and play voice messages, generate and store text messages, and provide integrated voicemail and fax mail services. One problem with such servers is that a specific telecommunications service exists through a single interface. Accordingly, users who utilize other interfaces—e.g., PSTN, Wireless, VOIP and the Internet—may be prohibited from accessing and using the telecommunications system for the desired service.

By way of illustrative example, prior art voicemail services provide a caller with an option to deposit a message when the called party does not answer the call, is out of range, or has switched off the phone. The storage of these messages is within a handset, as in U.S. Pat. No. 6,091,947, or on a system server. However, storage of the message at the system server requires that a mailbox be pre-provisioned when a user initially subscribes for the service, thereinafter a fixed storage space is allocated. This fixed storage space limits the user to the memory space provided and the user may fail to receive messages if his system quota has been filled.

Other problems with prior art telecommunications are now described. By way of example, U.S. Pat. No. 6,032,039 describes a notification message, which contains a call back number, caller ID, message type, time and date received. If the caller has to view the message, he has to dial a distinct common number provided to him by the service provider and, then, browse through the inbox to access his message. There is no direct way to view a particular message; it therefore takes much more time for a user to retrieve a specific message.

In conventional voicemail systems with roaming capability, a user is required to dial a new number from every roaming location in order to check his or her voicemail. It is therefore inconvenient for the user to remember the particular number for each location.

SUMMARY OF THE INVENTION

Certain embodiments hereof may overcome certain of the problems in the prior art by systems and methods hereinafter disclosed. Under one exemplary embodiment, network architecture is provided for use in an integrated communications system utilizing PSTN lines, wireless networks, voice over Internet protocol, email, facsimile and/or Internet sources. Messages may take the format of text (email, SMS, etc.), audio, graphic, image, facsimile, and/or video, for example. The architecture may be used, for example, by and between multiple users to exchange messages; in one embodiment, the architecture therefore operates to collect and store messages, intelligently notify users of new messages and facilitating convenient retrieval of messages.

Certain embodiments herein may also permit a user (using a first interface) to send a message to a recipient user (using a second interface); associated architecture dynamically collects, stores, saves, and deletes messages without user intervention, irrespective of the interface used.

In certain embodiments, "dynamic mailboxes" are employed to store messages. These dynamic mailboxes may include one or more of the following characteristics:

A mailbox is created only when a user receives the first message.

A mailbox is automatically terminated when a user has no new or saved messages in his mailbox.

A mailbox is deleted when a user ceases to be an active/valid user of the system.

A mailbox is automatically administered without user intervention, for example to delete old messages and/or to make additional space.

A mailbox is automatically managed by the system, through compression, backup and restoration that creates additional space when needed.

Mailboxes are provisioned to a scaleable set of users for a given level of system resources.

A mailbox has Uniform Messaging Service (UMS) functionality.

Messages for a mailbox may take different formats, for example voice, fax, email, SMS, etc.

Based on the user's home location, a mailbox is created on an appropriate server to provide synchronization and local access facilities.

Users of certain systems described herein below may be notified using Short Messaging Service (SMS), though other modes of notification may be used.

In accord with other embodiments herein, an individual message in a user's mailbox is assigned a unique message ID number, through which the user may selectively listen to a particular message (as opposed to serially scanning multiple messages in the mailbox, if desired). Convenient "one step" methodology may also be employed, as described below.

Certain advantages may be appreciated by systems and processes described herein below. In one example, users with different technologies, different media and/or different terminals may still communicate with others, anywhere at any time, for example. In another example, voice mail, fax, and e-mail messages may also be communicated through a single user interface, thereby simplifying message delivery and handling by improving how users receive, reply to, and manage messages, regardless of delivery mode.

In one embodiment, a process exchanges messages between users. Messages from a plurality of user networks having a plurality of network protocols are processed for storage in a message store. At least one of the messages in the message store is accessed from one of the user networks having any one of the network protocols.

In one embodiment, a communications system exchanges messages between users. A messaging store stores the messages. A messaging server accesses messages of the first message store. At least one server interfaces between the messaging server and user networks such that the messages are exchanged between the users, via the first messaging server and the first messaging store, even if the user networks employ a plurality of protocols.

In one embodiment, a process selectively retrieves messages for a subscriber, including: embedding information about a stored message within a notification for the stored message; communicating the notification to a subscriber over a network; and responding to interaction between the subscriber and the embedded information to communicate the stored message to the subscriber.

DETAILED DESCRIPTION OF DRAWINGS

Figure 1:
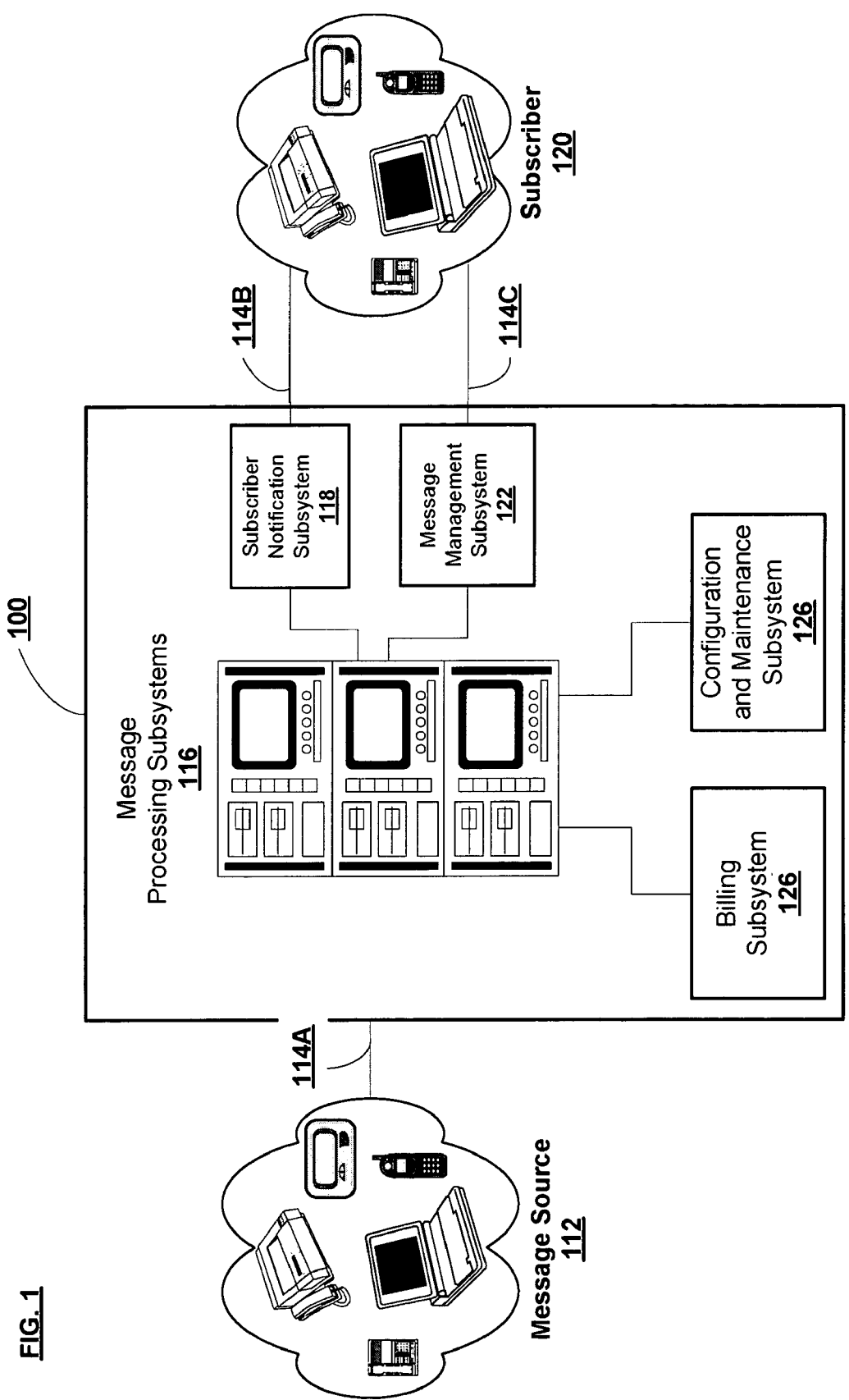
FIG. 1 shows one communications system for exchanging messages between users.

FIG. 1 shows one system 100 for exchanging messages between users. In one example, system 100 may provide messaging and voicemail. A message originates at a message source 112 (e.g., a user communicating messages via a fax machine, telephone, computer, phone or cell phone, wireless PDA, as shown). The message is, for example, text mail, voice mail, an image, or combinations thereof. A network connection 114A links message source 112 to a message processing subsystem 116. Network connection 114A is, for example, a telephone line, Internet connection, VOIP and/or wireless connection. As described in more detail below, one or more message processing subsystems 116 process the incoming messages from network connection 114A and deliver the messages to one or more subscribers 120, over a network connection 114B. Each subscriber 120 is, for example, a user receiving, managing and/or responding to messages through a fax machine, telephone, computer, phone or cell phone, or wireless PDA as shown.

In one embodiment, message processing subsystems 116 operate to screen messages, compress/decompress messages for storage/playback (such that messages are available to subscribers 120), and/or provide protocols to accept messages. In one embodiment, the protocols used to accept messages include voice prompts and V.29 facsimile protocol. Message processing subsystems 116 may further validate and/or reject messages of subscribers 120 without current accounts, reject unwanted messages ("spam"), and/or reject messages that are in a format unacceptable either to the user or a particular installation. In one example, a facsimile message from message source 112 is rejected by message processing subsystems 116 because a particular service provider has yet to provision or activate this system feature, or because the intended recipient subscriber 120 has set his or her preference to reject facsimile messages, as described below. In one embodiment, service provider configurations and user preferences are administered via a configuration and maintenance subsystem 126.

In one embodiment, during delivery of messages to subscribers 120, message processing subsystems 116 transforming speech-to-text, text-to-speech, and/or encode an analog message for digital storage. In another embodiment, message processing subsystems 116 contain ancillary features to track activities for billing and/or manage system configuration that will be respectively accomplished by billing subsystem 124 and configuration and maintenance subsystem 126, as shown.

Figure 2:
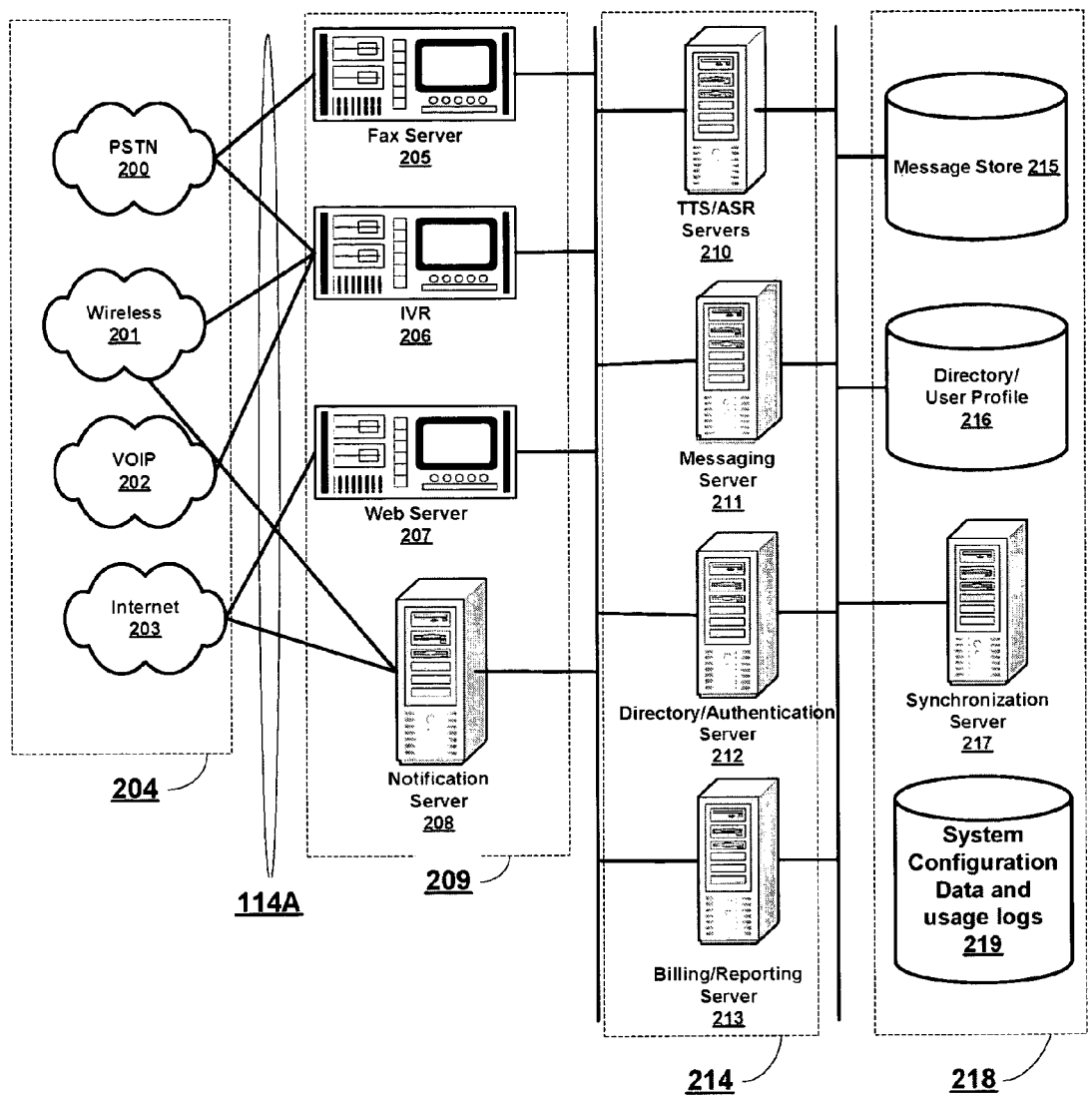
FIG. 2 is a block schematic diagram of network architecture suitable for use with the system of FIG. 1.

Once a message has been received, messaging processing subsystems 116 store and track the message in internal databases (see FIG. 2). A subscriber notification subsystem 118, connected with subsystems 116, may then format a notification with information regarding the stored message—such as caller name, caller number, and time of call, message ID—and send the notification to subscriber 120 informing the user of the message. Subscriber 120 may then interact with a message management subsystem 122, connected to subsystems 116 and to subscriber 120 through a network 114C, to retrieve, delete and/or otherwise manage his or her messages.

FIG. 2 is a block schematic diagram of network architecture suitable for use with system 100 (and, in particular, message processing subsystems 116, subscriber notification subsystem 118, message management subsystem 122, and billing subsystem 124) of FIG. 1. A first layer 209 of this architecture is the 'interface' layer (i.e., the 'front-end'). Through layer 209, system 100 may receive/transfer messages via one or more different network connections 204, for example Public Switched Telephony Network (PSTN) lines 200, Wireless networks 201, Voice over Internet Protocol (VOIP) 202 and/or the Internet 203. Layer 209 thus incorporates different protocols that enable system 100 to communicate with network connections 204 and over different network protocols. Users of system 100 may thus communicate through different networks and protocols at different times, and exchange messages across different networks and protocols.

In one embodiment, layer 209 incorporates a fax server 205 to enable fax messaging functionality using PSTN lines 200. Such fax messages may be stored in a message store 215 as SMTP/MIME messages with fax data as attachment, enabling users to access these fax messages via the Internet over TCP/IP protocol, for example. Access to the fax messages is for example enabled through a web server 207, which provides a graphical user interface. A subscriber 120 thus has the option of accessing fax messages via a telephone over a PSTN 200 network; in this case, that subscriber 120 also has the ability to access and manage the fax messages, and, optionally, to forward a fax message to another number, such as another mailbox or a fax machine.

In one embodiment, voice messages through PSTN lines 200, Wireless Networks 201 and/or VOIP 202 are routed to an Interactive Voice Response (IVR) unit 206, which provides a telephone user interface to access and manage appropriate mailbox(es). IVR 206 communicates with a "back-end" layer 218 of the network architecture of FIG. 2 through a messaging gateway 214, with data encapsulated in XML documents, for example.

In one embodiment, messages from Internet 203 are directed to web server 207 through Internet protocols. Access to a subscriber's mailbox is thus also provided through the Internet protocols and web server 207. In this example, web server 207 may also provide a graphical user interface for the subscriber to access and manage his/her mailbox, irrespective of the type of messages within the mailbox, be it email, fax, voicemail, etc. In one embodiment, a notification server 208 (for example operating as subscriber notification subsystem 118, FIG. 1) notifies subscribers 120 of messages. Notification server 120 for example operates whenever a user needs to be notified that a new message has arrived in his/her mailbox, when a new service is activated, and/or when a user needs to be prompted for action. In one example, newly arrived messages trigger notifications to the user through a message-waiting indicator, a stutter tone audio indicator, and/or as a short message service (SMS) notice on a mobile phone or pager. In the case of notification through SMS, notification server 208 sends out an intelligent notification, which is described in more detail in connection with FIG. 10. "One-Step" retrieval of the message by the subscriber may be provided, as described in more detail in connection with FIG. 11.

Messaging gateway 214 is thus a second layer in the network architecture of FIG. 2. In one embodiment, messaging gateway 214 contains certain core functions enabled by a messaging server 211, billing/reporting server 213, directory/authentication server 212 and/or other utility services such as TTS/ASR servers 210. TTS/ASR servers 210 provide text-to-speech and automatic speech recognition processes. Messaging server 211 provides access to message store 215 for message storage, access, retrieval and management. Directory/authentication server 212 cooperates with messaging server 211 to authenticate access to services and to implement system configuration, class of service, and/or service management functions. Billing/reporting server 213 functions to create and store CDRs (Call Detail Records), and may further provide for customizable reports. Web server 207 may further provide a web-based interface to billing/reporting server 213, if desired, enabling service providers to access and manage CDRs to generate billing data and reports.

In one embodiment, a back end layer 218 of the network architecture of FIG. 2 contains data/information for system 100. In one embodiment, layer 218 includes message store 215, directory/user profile store 216, synchronization server 217, and/or other servers (e.g., server 219) to store information such as configuration data, system logs, and usage logs. Back-end layer 218 may be shielded from direct interfaces with user applications. In one embodiment, therefore, layer 218 interfaces with the "outside" world through standard protocols administered by separate servers; this enables server deployment to be scaled upwards to meet increasing traffic volume by distributing workload across separate servers.

Message store 215 collects and organizes messages in mailboxes. In one embodiment, message store 215 is organized with indexing such that messages are efficiently deposited, managed and retrieved. In one embodiment, message store 215 collaborates with directory/authentication server 212 to provide authenticated access to the mailboxes and to ensure that mailboxes are accorded the proper grades of service based on user, message type, and other parameters.

In one embodiment, directory/user profile store 216 contains user-related information, such as user profiles, preferences, and access/authentication/service attributes for all users; and synchronization server 217 enables message and data synchronization between various nodes in the network, thereby enabling roaming functionality to user access and management of the mailbox from any network in the node. Accordingly, when a subscriber is roaming, his/her messages are copied to server in the roaming location (see FIG. 6); this enables the subscriber to access his/her mailbox even while roaming. In order to facilitate the roaming functionality, subscriber preferences are also replicated in the roaming location so that the subscriber has consistent access to his/her mailbox. The data and messages replicated in server 217 are kept in the roaming location for the duration of roaming. That is, when the user returns to the home location (see FIG. 6), the data at the roaming location may be deleted.

Figure 3:
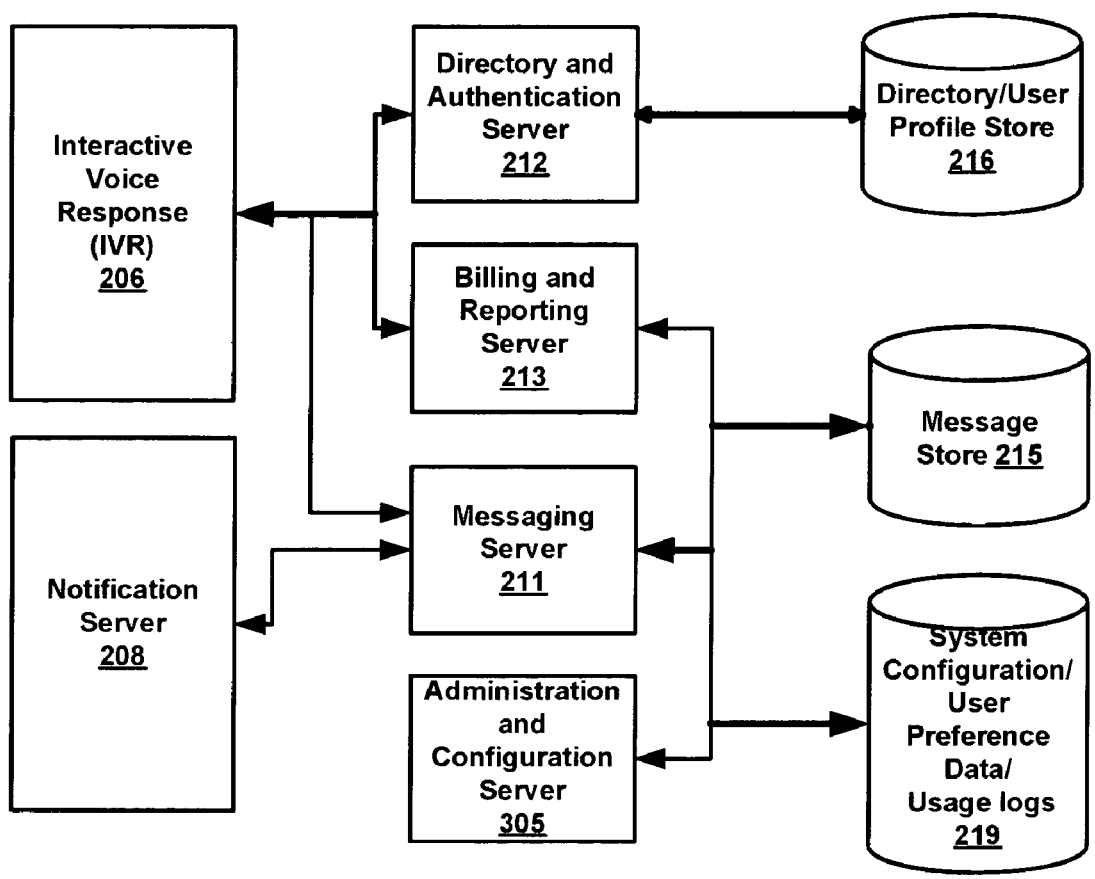
FIG. 3 illustrates exemplary relationships and data flow for the network architecture of FIG. 2.

FIG. 3 is a block diagram illustrating exemplary relationships (and data flow) for the network architecture of FIG. 2. In one example, if a call made to a subscriber 120 is unanswered, IVR 206 receives the call. In the example, IVR 206 first sends requests to directory/authentication server 212 to collect subscriber profile information and the subscriber's mailbox/message preferences. Once identifying data for the call is collected (e.g., Caller ID, Called number, and reason call forwarded, etc.), IVR 206 requests that messaging server 211 encode, compress and then format the message, for storage in a desired location (e.g., within message store 215).

In another example of FIG. 3, IVR 206 requests that billing and reporting server 213 log message and call data; this data is later used for billing and reporting purposes according to specified service parameters and rates. This billing may be set according to (a) the amount of memory used to store data for a particular subscriber 120 or (b) a fixed monthly subscription rate, for example.

In one embodiment, an administration and configuration server 305 is provided, for example as another server of gateway 214, FIG. 2. Administration and configuration functions of server 305 may be accessed via a web interface through web server 207, for example. Server 305 provides for provisioning, system configuration, administration, monitoring, and/or user management functions. User preference data and system configuration stored in server 305 may be used in the automated management of mailboxes, the details of which are described in more detail in connection with FIG. 9.

Figure 4:
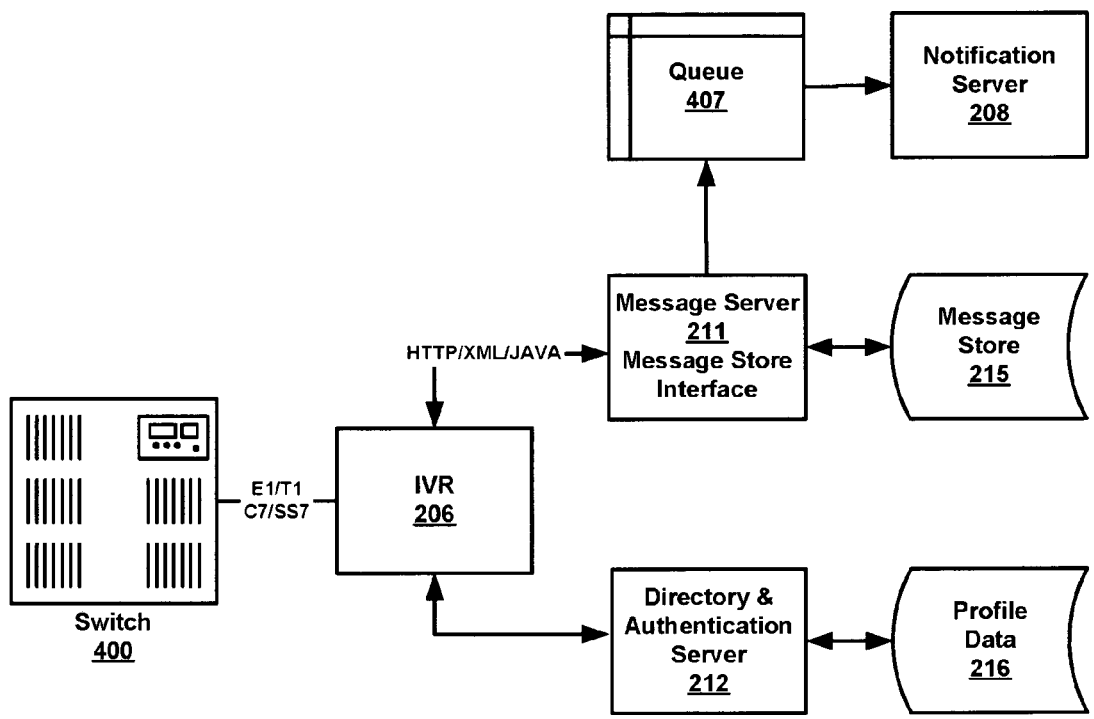
FIG. 4 shows exemplary data paths to and from certain components of the network architecture of FIG. 2.

FIG. 4 shows, in one embodiment, exemplary data paths to and from certain components of the network architecture of FIG. 2. When a call remains unanswered, a switch 400 (e.g., associated with PSTN network 200, FIG. 2) transfers the call to IVR 206 over data path 401 using, for example, a E1/C7 or T1/SS7 protocol (implemented by IVR 206 using telephony hardware). IVR 206 then answers the call, greets the caller using a customizable preset user greeting, and invites the caller to leave a message for the user. That message is digitized, compressed and encoded to a sound file format (e.g., a Resource Interface File Format (RIFF) wav file). In one embodiment, IVR 206 optionally implements message caching such that IVR 206 retains a local copy of a message in local storage space (the message being a copy also sent to message store 215). The message caching facilitates faster access to the message and reduces latency associated with subscriber accesses to the message. The size of memory cache within IVR 206, and the duration of local storage are all configurable through administrative and configuration server 305, FIG. 3.

Those skilled in the art appreciate that switch 400 may be illustrative and may comprise a mobile switching center incorporating many physical switches.

Continuing with the example of FIG. 4, IVR 206 deposits the received message in message store 215 over data paths 403 and 405. This is accomplished by initiating a request to messaging server 211 which in turn interacts with message store 215 to deposit the message. Messaging server 211 is for example accessed via HTTP protocols using XML/JAVA. The message is then compressed, encoded, and composed in SMTP/MIME format—with the voice part as the attachment, for example—and sent to message store 215 for storage and subsequent retrieval. Once the message is deposited in message store 215, messaging server 211 populates a queue 407 with data about the arrival of the new message. Notification server 208 scans through data in queue 407 to send out notifications to appropriate subscribers 120. FIG. 4 also illustrates data path 407, connecting IVR 206 with directory and authentication server 212, and data path 409, connecting server 212 with profile store 216.

Figure 5:
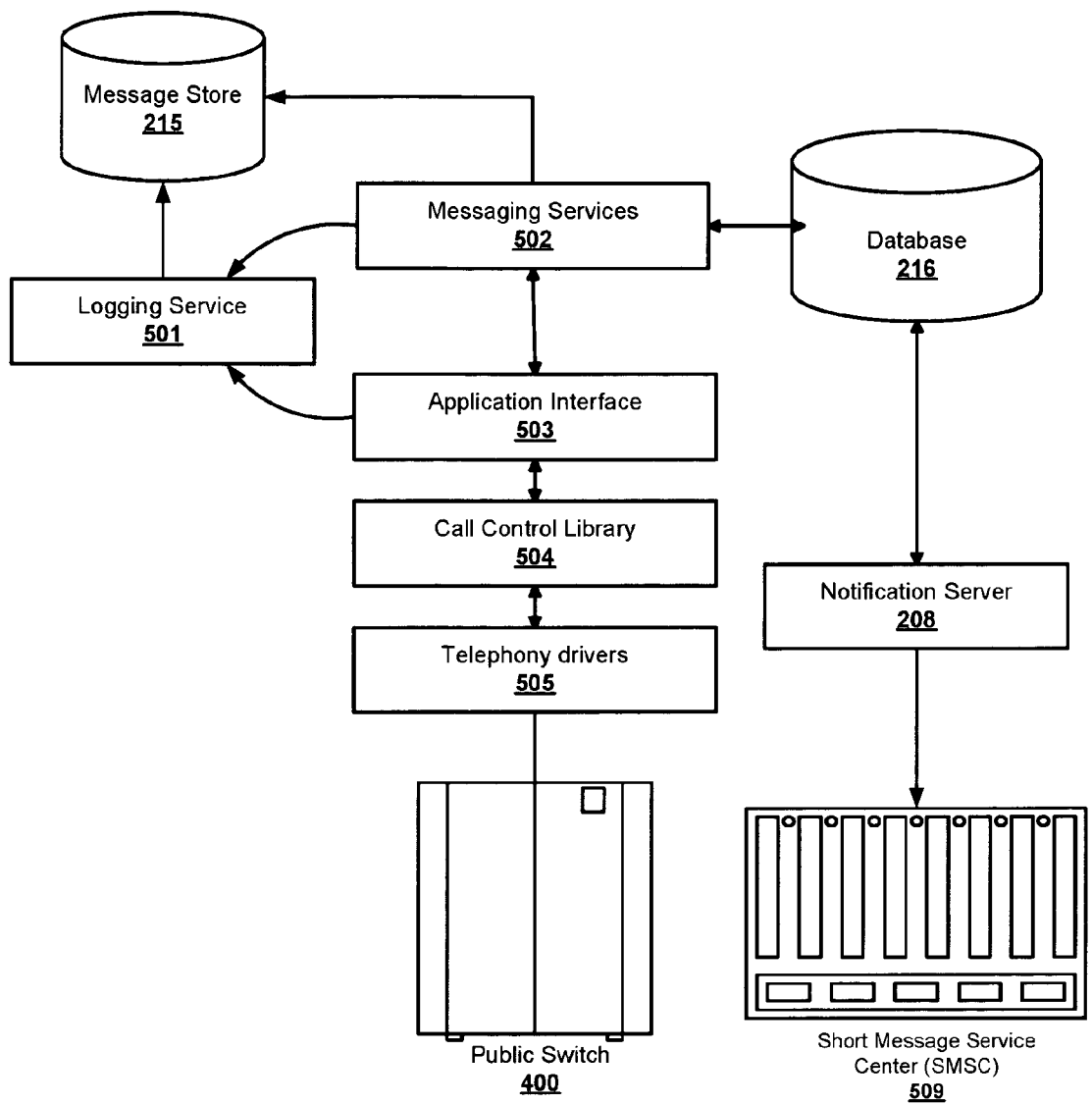
FIG. 5 illustrates processing by and between certain components of the network architecture of FIG. 2.

FIG. 5 illustrates processing by and between certain network architecture components of FIG. 2, in accord with one embodiment. When a call is unanswered, switch 400 (FIG. 4) transfers the call to IVR 206. The first stage of IVR 206 includes low-level telephony drivers 505; these drivers answer calls, configure the number of rings to answer, collect the caller ID and signal the end of recording. Telephony drivers 505 work in conjunction with the high level software programs that answer calls, record information, utilize called IDs, and transfer calls.

Figure 10:
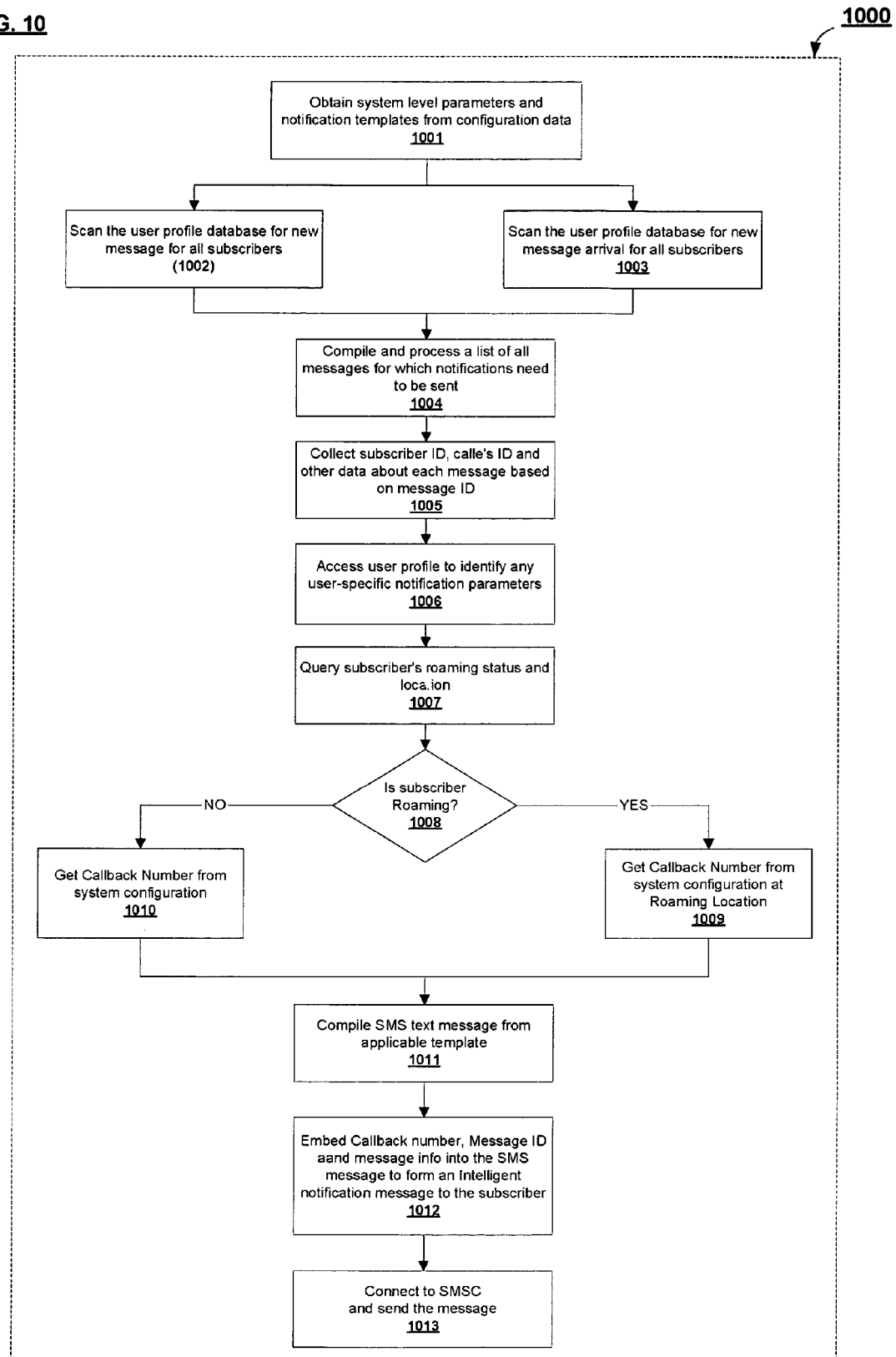
FIG. 10 shows one intelligent notification process.

Continuing with the current embodiment, the next stage of IVR 206 is the call control library 504, which handles different network interfaces and signaling protocols, for example E1/C7 or T1/SS7 communication links between telephony hardware and switch 400 used to connect between the local telephone network and a common call control programming and protocol environment. Library 504 implements functions that are common to interface-specific libraries in a consistent manner, and translates and routes application requests to the appropriate application interface 503. Application interface 503 provides connectivity between call control library 504 and higher-level application processes such as logging services 501 and messaging services 502: logging services 501 represents a process or set of processes that create and deposit call log data (e.g., CDR), usage data and system log data in message store 215 (voice messages may also be stored with indexing data); messaging services 502 capture, compress and format the recorded message for storage in message store 215. In the example, voice messages are deposited and retrieved in compressed form and decompressed for playback using appropriate compression/decompression techniques In the embodiment, of FIG. 5, directory/user profile database 216 stores user profiles, mailbox profiles, as well as other transient and configuration data. It implements profiling schema that may be used to provide various messaging services. In addition to user profiles, usage data, system logs and configuration data may also be stored in database 216 of FIG. 5, including, for example:

Telephony Services Parameters
  Type of Channel
  Number of Channels
Parameters for messaging service process 502
  Maximum message size
  Maximum number of messages
  Maximum number of days to store messages
Parameters for databases 216, 217, and 219
  Database Server name
  Database Port number
Voice compression parameters
Parameters for notification services 508
SMS protocol parameters
  SMS Port Number
  Stutter Tone
  Dial-out
  Email
Parameters for logging services 501
  Log Directory
  Rotation parameters In one embodiment, notification services 508 utilize short messaging service (SMS) to implement intelligent notification, which is further described below with respect to FIG. 10. Notification server 208 thus implement various SMS protocols—such as SMPP/CIMD2/HTTP or SMTP interfaces—to communicate with short messaging service centers (SMSC) 509 (typically over TCP/IP). These protocols facilitate sending and receiving messages to/from the subscriber's mobile phones.

In the current embodiment, notification server 208 checks for new message entries for which notifications have not been sent and gathers information (e.g., caller identification (ID), time, length, etc.) about such messages based on Message IDs. It then sends SMS messages—including the Access Number (stored in database 219), Caller ID and Message ID—and updates a notification table within notification server 208. The notifications are then passed onto SMSC 509, which sends and receives SMS messages to the subscriber's mobile phone.

Figure 6:
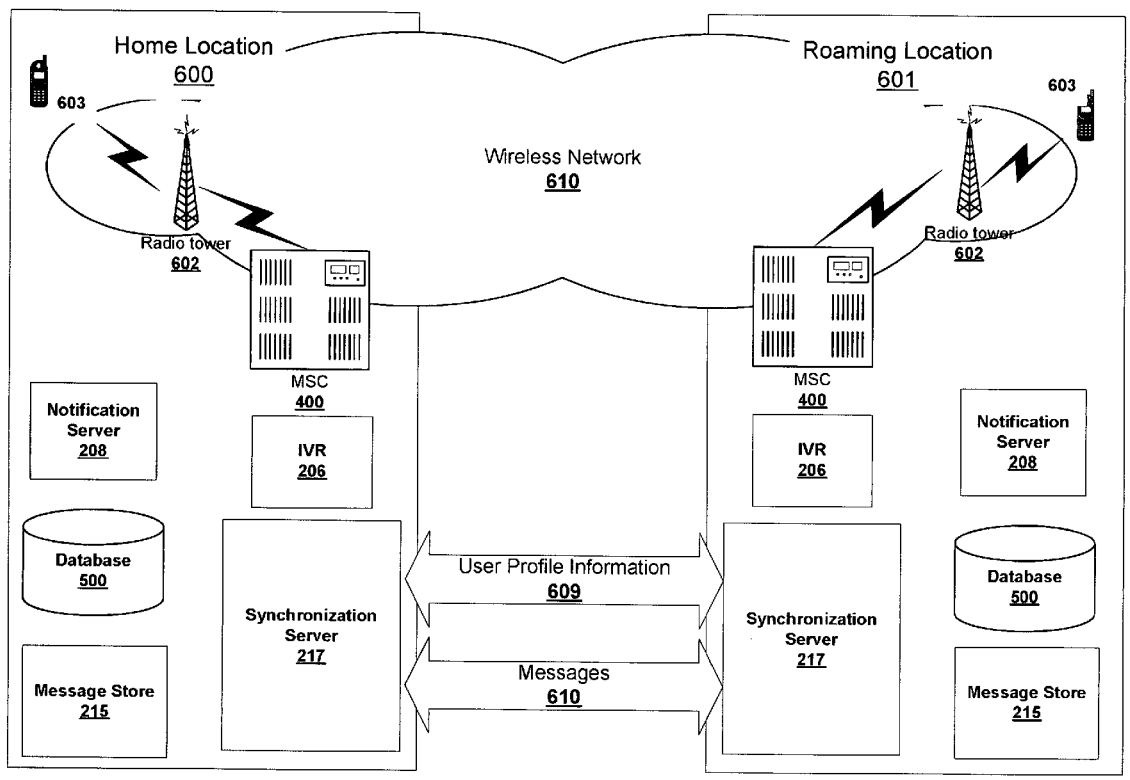
FIG. 6 illustrates synchronization between servers at a home location and at a remote location.

FIG. 6 illustrates synchronization between servers 217 at a home location 600 and at a remote location 601, in accord with one embodiment. Each location 600, 601 includes like components (e.g., synchronization server 217 and IVR 206, FIG. 2-FIG. 4), as shown. A radio tower 602 illustratively beams and receives signals to and from mobile phones 603, as shown. A Mobile Switching Center (MSC) 400 performs the switching of calls between the mobile users, and between mobile and fixed network users (i.e., the respective switch 400 at location 600 and 601 serves to route/forward calls to the appropriate terminating number). If a call is left unanswered, IVR 206 receives the call and guides the caller(s) to voice message functionality as described above (e.g., as illustrated in FIG. 6 by notification server 208, message store 215, IVR 206 and synchronization server 217).

In one embodiment, therefore, similar network architecture (to the architecture at locations 600, 601) is provided at all locations in the telephony network. When constructed in this manner, synchronization server 217 enables message and data synchronization between nodes (each node for example represented by MSC 400) so as to enable roaming functionality to the user, who can then access and manage his or her mailbox from any network in the node In FIG. 6, synchronization servers 217 are also responsible for synchronizing user profile information 609 (e.g., profile database and message store synchronization data based on user's current location) and text, audio, video and voice messages 610 between the home and roaming locations 600, 601. When a user (i.e., a subscribed to system 100, FIG. 1) roams in another location, therefore, he is notified (by notification server 208) of voicemail. The user may then dial in to message store server 215 at the roaming location and retrieve his message. This is made possible due to the synchronization by and between servers 217, which enables the user to maintain access and stay updated with voicemails even while roaming. For a user who is at 'roaming' location 601 (i.e., a location within our outside of the country and away from his/her 'home' location 600), server 217 at 'home' location 600 synchronizes with server 217 at 'roaming' location 601 to facilitate easy user access to his/her mailbox.

FIG. 6 further illustrates that a user may instantly reply to a received voicemail. Consider a first user on a first telecommunications service provider communicating voicemail to a second user on a second telecommunications service provider. In this example, the second user is given an option to reply to the voicemail message when he/she listens to the message. The reply message is recorded and sent across a wireless network 610 to the first user. Network 610 is synchronized with server 217 at home location 600.

Those skilled in the art appreciate that databases such as illustrated in the various figures may represent logical storage incorporating multiple physical storage devices. For example, FIG. 6 shows a database 500 which, for example, may store selective data elements of message store 215, if desired.

Figure 7:
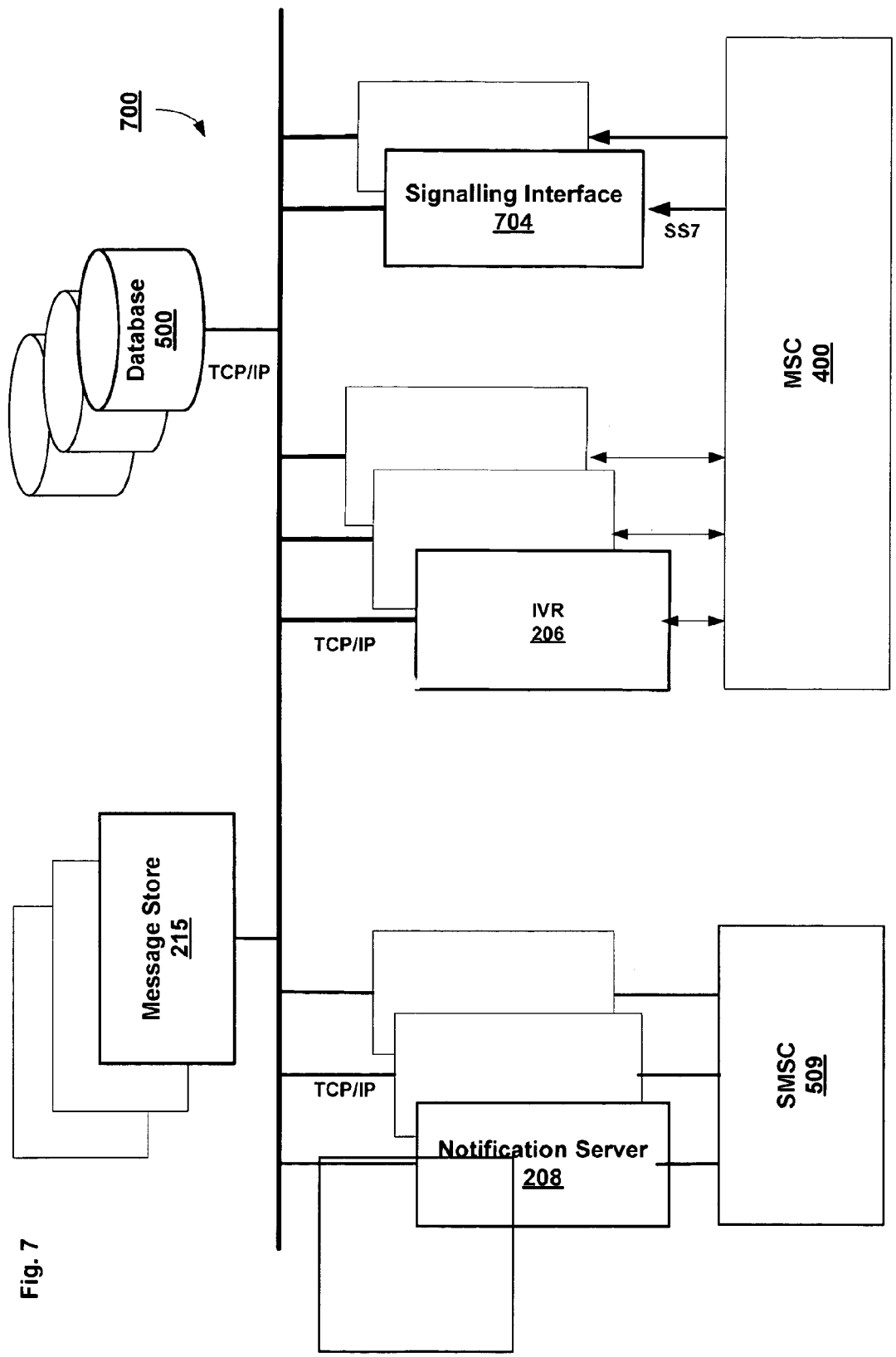
FIG. 7 shows one system illustrating scalability of network architectures

FIG. 7 illustrates one system 700 showing scalability of network architectures described hereinabove, in accord with one embodiment. Since system 700 is based on an "open" architecture, it may be scaled to include more components whenever needed. The open architecture also facilitates compatibility with other existing systems or components in the service providers' network. Specifically, with increasing numbers of subscribers or messages, or message size, additional message store(s) 215, database(s) 500, notification server(s) 208, IVR 206 and signaling interfaces 704 are added as needed, such as shown in FIG. 7. In FIG. 7, MSC 400 communicates with IVR 206 and signaling interface 704 through the SS7 protocol, while TCP/IP is used for communication between messages store(s) 215 and database(s) 500, notification server(s) 208, IVR 206 and SMSC 509.

Figure 8:
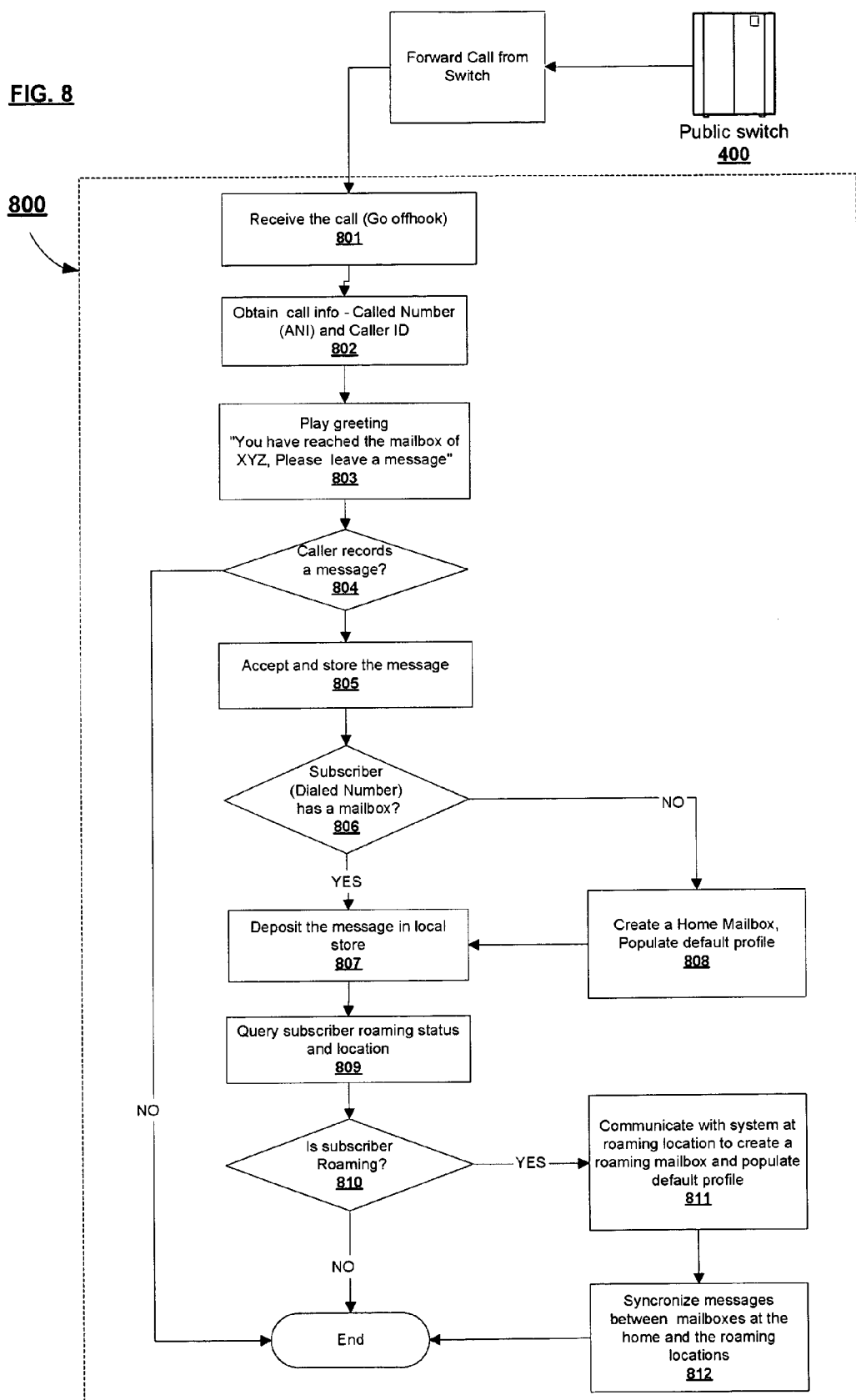
FIG. 8 shows one process for employing dynamic mailboxes.

FIG. 8 is a flow chart illustrating one process 800 for employing dynamic mailboxes. Process 800 is for example implemented by system 100, FIG. 1. When a call to a subscriber remains unanswered, the call is forwarded by switch 400 to system 100. System 100 then receives 801 the call and obtains 802 relevant information about the call, such as the caller ID and the called number (ANI). The caller is then greeted 803 with a message, for example saying that they have reached the voice mailbox of the subscriber (identified for example either by the subscriber name, if recorded and available in system 100, or the phone number) and prompting the caller to leave a message for the subscriber. If 804 the caller records a message, the message is accepted and stored 805 (along with associated Caller ID and the ANI) in a temporary storage location. Then, the user profile database is queried 806 to verify if the subscriber (identified by ANI) already has a mailbox within system 100. If so, the message is deposited 807 in the existing mailbox.

If 806 the subscriber does not have a mailbox in system 100, a mailbox is created and populated 808 with default profile values; the message is then deposited 807 in the newly created mailbox.

Once the message is deposited 807 in the appropriate mailbox, the subscriber's roaming status and location is obtained 809 from switch 400 or from the registry on the carrier network. If 810 it is established that the subscriber is roaming (e.g., at roaming location 601, FIG. 6), then a request is sent to system 100 at the roaming location to create 811 a mailbox for the subscriber, the mailbox being initialize with default values.

The message from the mailbox at the home location (e.g., location 600, FIG. 6) is then appropriately transferred or copied 812 to the roaming location by invoking the mailbox synchronization process, such as described in connection with FIG. 6.

Figure 9:
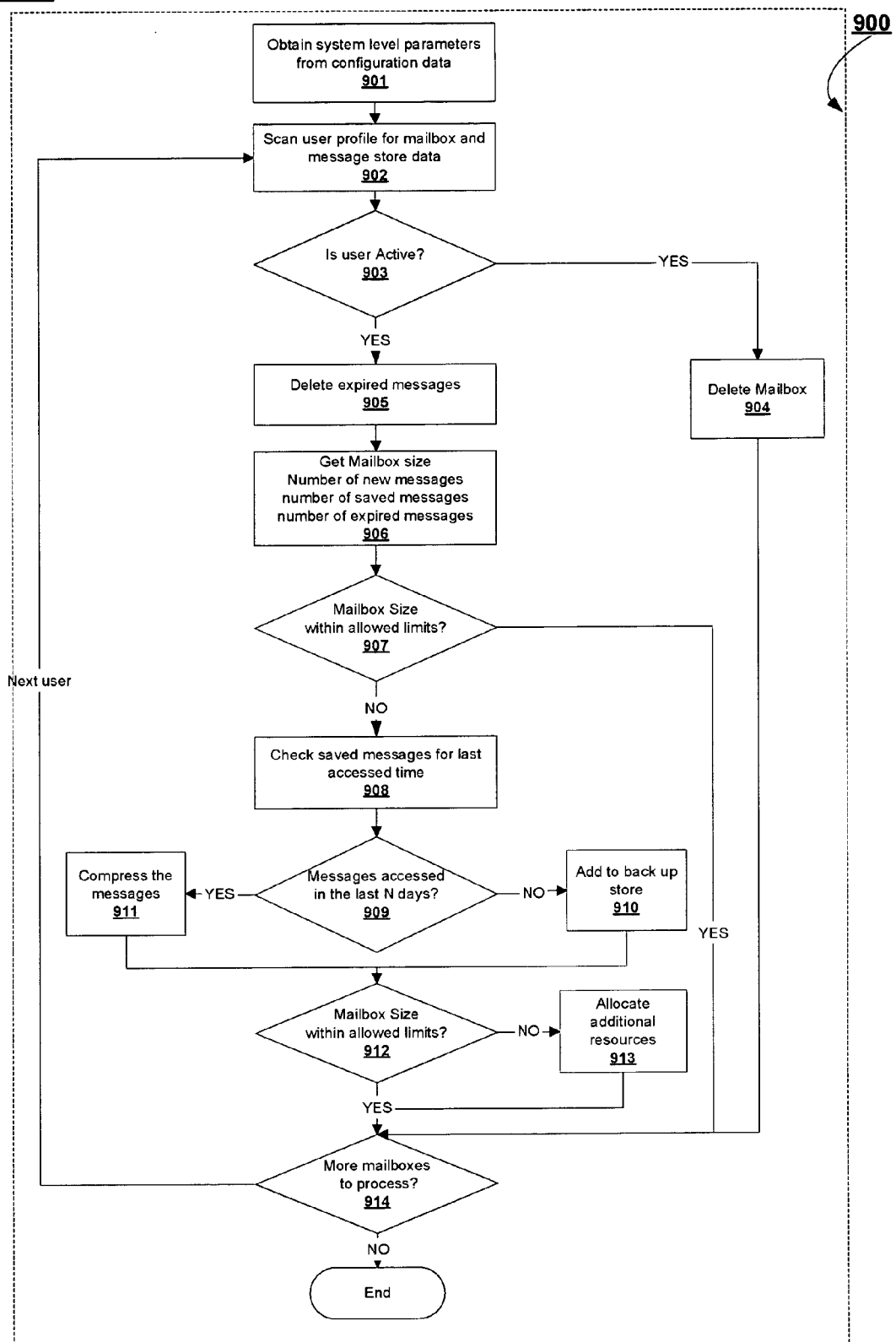
FIG. 9 shows one process for automatically managing a mailbox.

FIG. 9 is a flow chart showing one process 900 of automatically managing dynamic mailboxes. The process of FIG. 9 is for example implemented by system 100, FIG. 1. Process 900 may run at a configurable time interval, or may be invoked by system 100 based on certain events, for example if a drop in the level of available free system resources occurs below set tolerances. Process 900 begins with obtaining 901 relevant system level parameters such as maximum number of days, maximum number of messages, mailbox size, incremental size, etc., from configuration data in database 219, FIG. 2. Process 900 may sequentially access and analyze each user mailbox in system 100 within a target range (the 'target range' defines one or more mailboxes, or all mailboxes, as a set of mailboxes to be processed in process 900), as indicated by step 914. For each user, the profile and the corresponding mailbox data is retrieved 902 from database 216. If 903 the user's status is inactive, then the entire mailbox is deleted 904; otherwise the mailbox is further analyzed and administered per steps 905-913.

In step 905, all expired messages in the mailbox (e.g., all messages older than a specified number of days determined by system parameters) are purged from the mailbox. The size of the mailbox is then determined 906 based on the type, number, state, and size of the messages and compared with the allocated maximum size. If 907 the size of the mailbox is within allocated limit, no action is taken; however, if the mailbox size has exceeded the allowed limit, or is close to the limit, each saved message in the mailbox is checked 908 for date/time of the last access. If 909 a saved message has not been accessed by the users for a specified number of days, the message is added 910 to backup/archival storage (e.g., within message store 215). All other saved messages are compressed 911, thereby reducing mailbox size.

If 912 the size of a mailbox does not collapse below the allowable limit, after the above actions, additional resources are allocated 913 to the mailbox based on the user profile, including, for example, the type of the service(s) the user has subscribed and the number and type of messages relevant to such services. After all user profiles and associated mailboxes in the target range specified by process 900 are analyzed and administered, process 900 ends.

FIG. 10 shows one intelligent notification process 1000 that is for example optionally employed by system 100, FIG. 1, to inform users of new messages or to remind users of messages that have not been accessed through SMS text messages.

Process 1000 begins with obtaining 1001 system level parameters, such as home location, access/callback numbers, message types, time intervals for message notifications, etc., from configuration data in database 219, FIG. 2. Message data (e.g., metadata for all messages that is stored in database 215) is then (a) scanned 1002 for either all new messages that have arrived at system 100 and/or (b) scanned 1003 for any messages that have not been accessed by the user for a specified number of days after initial notification. From steps 1002, 1003, a list of messages (message queue) is compiled 1004 that require notifications be sent to respective recipient subscribers.

For each message that requires user notification (either a new notification or a reminder notification), associated information—such as user ID, caller ID, message ID (which is unique ID associated with each message in a user's mailbox), message date/time, message type, message length—is collected 1005 from database 215, FIG. 2. Through user IDs, the profile of a user associated with a message is then queried 1006 to determine any user-specific notification parameters that may have been set. Thereafter, the user's roaming status is determined 1007 by querying switch 400 or the registry within the respective carrier network. If 1008 the user is roaming, then the associated current callback number for the roaming location is obtained 1009 from system configuration of the roaming location; otherwise the callback/access number for the home location is obtained 1010 from system configuration parameters for the home location. Once necessary information for a message is available, as described above, an appropriate notification text message is compiled 1011 from a message template for a given message type. Information associated with the message—such as the callback number, message ID, message date/time/type/size—is then embedded 1012 in the notification text forming a complete intelligent notification SMS text message for the user. The SMS text message is then sent 1013 to the user by connecting to the SMSC 509 associated therewith and by using appropriate protocols (such as described in connection with FIG. 3).

Figure 11:
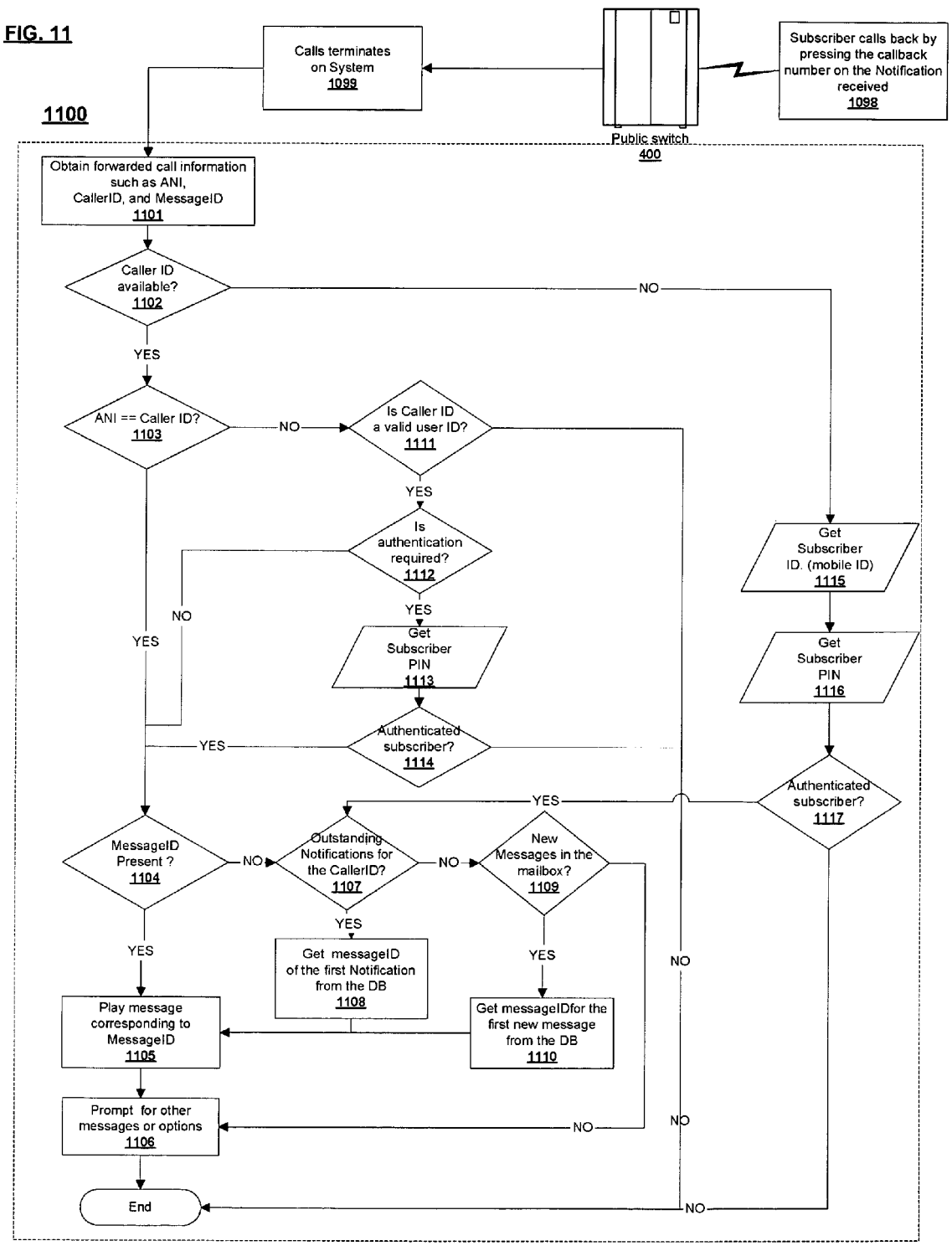
FIG. 11 shows one selective message retrieval process.

FIG. 11 shows one message retrieval process 1100 including 'selective one-step retrieval' of messages. Process 1100 may be implemented, for example, by system 100, FIG. 1. In the example of FIG. 11, when a user receives an SMS notification through intelligent notification process 1000, FIG. 10, the user has the option to call back 1098 the number embedded in the SMS message (along with the message ID) using the 'use number' option on mobile phone or by directly dialing the access number for message retrieval from any phone. When the user calls back using either such option, the call is forwarded 1099 by switch 400 to system 100 (in this example), which then collects 1101 available information for the forwarded call, such as the ANI, caller ID, message ID.

In step 1102, the presence of caller ID is checked. If 1102 the caller ID is present, then it is compared 1103 with the ANI. If 1103 those two values match, it denotes that the user is calling his or her own number to retrieve messages. If 1104 the message ID is also available, then the message corresponding to the message ID is played 1105 for the user. Accordingly, steps 1102-1105 represent selective one-click message retrieval whereby a message is conveniently retrieved by a user by pressing the callback number embedded in the SMS notification sent to them.

If 1104 a message ID is not available, then the outstanding notifications are checked 1107 to see if the user—identified by the caller ID—has any messages pending. In case pending notifications are found, the message ID associated with the first pending notification is retrieved 1108 and the corresponding message is played 1105 for the user. If 1107 no pending notifications are found, the user's mailbox is queried 1109 to check if any new messages are pending for the user. If 1109 messages are pending, the message ID for the first new message in the mailbox is retrieved 1110 and the corresponding message is played 1105 to the user. If 1109 no pending messages are found, the user is prompted 1106 to choose other options, such as to listen to saved messages.

If 1103 the ANI and the caller ID are both available, but the values do not match, then the caller ID is validated 1111 to see if it belongs to a valid/active user of system 100. If 1111 the caller ID is not a valid user ID, then further access is denied (e.g., process 1100 ends). If 1111 the caller ID is a valid user ID, then step 1112 determines whether to authenticate the call (step 1112 can be determined by system configuration parameters or by the user profile associated with the caller ID). If 1112 yes, the user is prompted 1113 for a PIN. The caller is then authenticated 1114 using the caller ID and the entered PIN. The user is granted further access (to step 1104) only if authentication 1114 succeeds or if the system and/or user profile do not require authentication.

After the user has been authenticated 1114, process 1100 checks 1104 for the availability of a message ID. If 1104 the message ID is available, then the message corresponding to the message ID is played 1105 for the user, as above. If 1104 the message ID is not available, then process 1100 continues with step 110, as above.

If 1102 the caller ID is not available for the call, then the user is (a) prompted 1115 to enter a phone number and (b) prompted 1116 to enter a PIN, both used to authenticate the user. If 1117 user authentication is successful, then process 1100 continues with step 1107 as shown.

Figure 12:
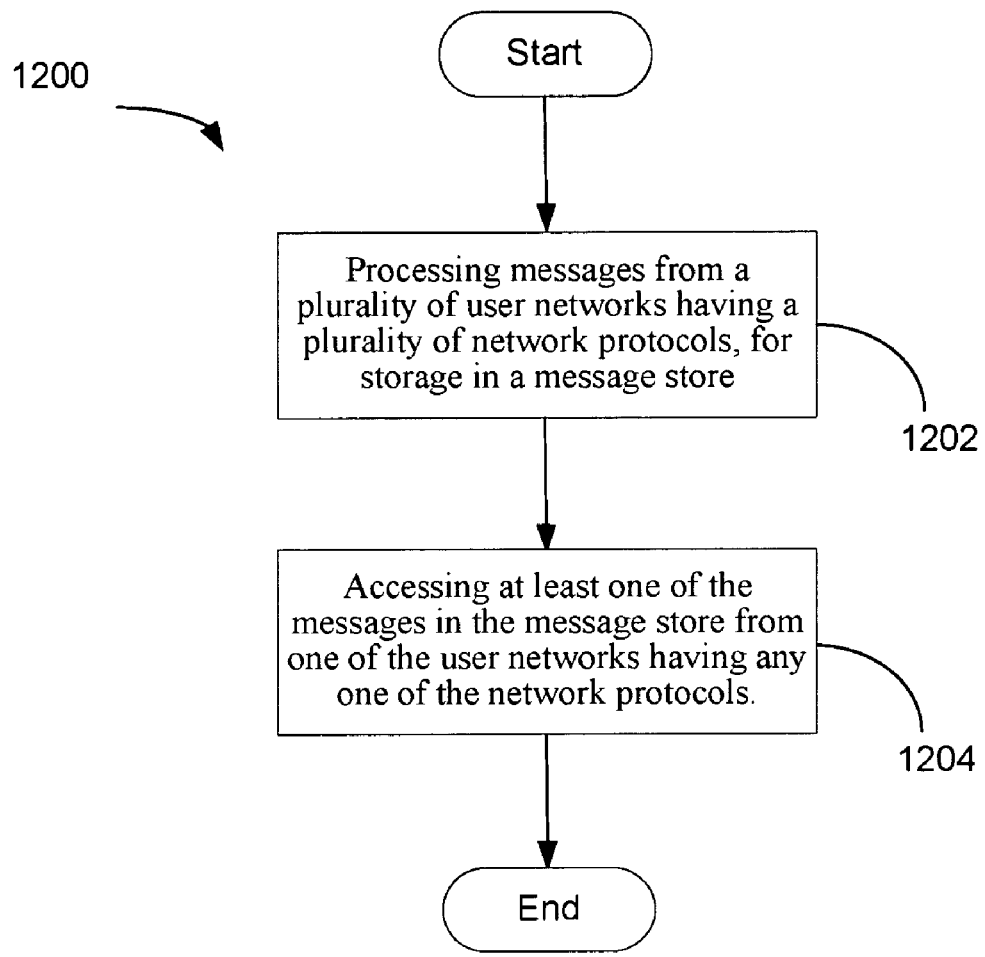
FIG. 12 shows one method for exchanging messages between users.

FIG. 12 shows one process 1200 for exchanging messages between users. Process 1200 is for example implemented by system 100, FIG. 1. In step 1202, messages from a plurality of user networks having a plurality of network protocols are processed for storage in a message store. In step 1204, at least one of the messages in the message store is accessed from one of the user networks having any one of the network protocols.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for exchanging messages between users; comprising:
    processing messages from a plurality of user networks having a plurality of network protocols, for storage in a message store;
    accessing at least one of the messages in the message store from one of the user networks having any one of the network protocols;
    obtaining configuration information about a mailbox for organizing at least one of the messages in the message store;
    purging all expired messages of the mailbox; and
    when the mailbox has a size that exceeds an allocated limit:
        archiving only messages of the mailbox that have not been accessed by a subscriber for a predetermined time period, and
        compressing only messages of the mailbox that have been accessed by a subscriber within the predetermined time period.

2. The method of claim 1, wherein the messages comprise one or more of the following message formats: voicemail, email, facsimile, SMS, video and agraphical image.

3. The method of claim 2, the step of processing comprising transforming at least one of the messages from one message format to another message format.

4. The method of claim 1, further comprising sending a notification of at least one message in the message store to a user connected with one of the user networks.

5. The method of claim 4, the step of sending comprising embedding in the notification information about the at least one message of the notification, wherein a user accessing the notification directly accesses the message of the notification in responding to the notification.

6. The method of claim 1, the step of processing comprising the steps of:
    associating one or more of the messages with a subscriber;
    determining whether the subscriber has an existing mailbox;
    if the subscriber has the existing mailbox, storing the one or more messages in the existing mailbox; and
    if the subscriber does not have the existing mailbox, creating a new mailbox and storing the one or more messages in the new mailbox.

7. A method for automatically managing dynamic mailboxes, comprising:
 obtaining configuration information from one or more dynamic mailboxes;
 purging all expired messages of the dynamic mailboxes; and
 for each dynamic mailbox having a size that exceeds an allocated limit:
  archiving only messages of the dynamic mailbox that have not been accessed by a subscriber for a predetermined time period, and
  compressing only messages of the dynamic mailbox that have been accessed by a subscriber within the predetermined time period.

* * * * *

UNITED STATES PATENT AND TRADEMARK OFFICE
CERTIFICATE OF CORRECTION

PATENT NO. : 7,505,571 B2
APPLICATION NO. : 10/661962
DATED : March 17, 2009
INVENTOR(S) : Sabeer Bhatia, Nagendra Siravara and Vinay S. Kantak It is certified that error appears in the above-identified patent and that said Letters Patent is hereby corrected as shown below:

Column 3, Line 29, "architectures" should read --architectures.--;
Column 7, Line 45, "techniques" should read --techniques.--;
Column 8, Line 47, "node" should read --node.--;
Column 12, Line 24, Claim 1, "users;" should read --users,--; Line 45,
  Claim 2, "agraphical" should read --a graphical--; Line 48, Claim 3, "anothermessage"
  should read --another message--.

Signed and Sealed this

Sixteenth Day of March, 2010

David J. Kappos
*Director of the United States Patent and Trademark Office*